UNITED STATES PATENT OFFICE.

JOHN COLLINS CLANCY, OF NIAGARA FALLS, NEW YORK, ASSIGNOR TO THE NITROGEN CORPORATION, OF PROVIDENCE, RHODE ISLAND, A CORPORATION OF RHODE ISLAND.

CATALYST FOR AMMONIA SYNTHESIS AND PROCESS OF PREPARING THE SAME.

1,363,392.  Specification of Letters Patent.  Patented Dec. 28, 1920.

No Drawing.  Application filed December 20, 1919. Serial No. 346,320.

*To all whom it may concern:*

Be it known that I, JOHN COLLINS CLANCY, a citizen of the United States, residing at Niagara Falls, in the county of Niagara and State of New York, have invented certain new and useful Improvements in Catalysts for Ammonia Synthesis and Processes of Preparing the Same, of which the following is a specification.

This invention relates to improvement in the synthesis of ammonia from its elements, and in this connection concerns the provision of a particularly active catalyst through the intermediacy of which said synthesis can be efficaciously effected.

In my pending application, entitled: Ammonia synthesis and catalyst therefor; Serial No. 283,012; filed March 17, 1919, I have described the production of a number of catalysts which while differing materially from the class of catalysts hereinafter described, are, nevertheless, possibly related thereto.

Upon this point I have not thus far been able to satisfy myself as to the exact degree of relationship, owing to the extreme difficulty of ascertaining the precise nature of the complex product or products, formed by the treatment of compounds such as calcium ferrocyanid, in the manner herein set forth.

It will be well to add that the production of really efficient catalysts from such materials as those hereinafter specifically mentioned, is by no means simple. In fact it is extremely technical and it is one of the objects of the present invention, to point out with particularity the steps in the preparation of such a catalyst, which when closely followed will enable those skilled in the art to achieve that which in the light of published disclosures, has been practically impossible heretofore;—namely, to produce a catalyst for the synthesizing of ammonia from its elements, whereby said synthesis may be effected at but moderately high pressures, such as 100 atmospheres or even lower, and in relatively inexpensive apparatus and under conditions which are not commercially impossible.

That this broad assertion is not unfounded, will be apparent to those familiar with the work of many of the allied Governments during the recent great war.

Many millions of dollars were expended in efforts to fix free nitrogen in the form of ammonia by combining hydrogen with said nitrogen through the intermediacy of a catalyst; and in spite of the multitudinous descriptions in the art concerning alleged catalysts, so far as I am aware, not a single catalyst was discovered by either the U. S. Government, the British Government, or the French or Italian Governments, which was in any way well adapted to meet the urgent demands of the situation.

The foregoing and other objects of my invention will be hereinafter referred to, and the novel combinations of steps which constitute my improved process, and the elements which, in combination, constitute my preferred catalyst, will be more especially pointed out in the claims appended hereto.

Such materials as calcium ferrocyanid, barium ferrocyanid, strontium ferrocyanid, or potassium ferrocyanid, or the corresponding ferricyanids, are of importance in the present connection primarily because of their adaptability, when properly treated, to yield active catalytic bodies; and, further, because such materials are relatively inexpensive and especially well adapt themselves to the purpose under consideration, because of the solubility of these substances in water, the value of which characteristic will be hereinafter pointed out.

By way of exemplification, I shall describe the perparation of a catalyst from calcium ferrocyanid, and as the principles involved in this treatment are applicable to the equivalent materials, it is believed that such description will suffice for all.

Starting with substantially chemically pure calcium ferrocyanid, I first preferably dissolve this normal salt in water and concentrate the solution until it is saturated. A suitable support for the catalyst, such as pumice, asbestos wool, or the like, is then treated to free it from injurious substances such as sulfur.

The preferred support is pumice stone, which I wash well with hydrochloric acid and then, in fact, allow to soak in said acid for a number of hours, to completely eliminate any sulfur present.

The so treated pumice, or equivalent support, is then washed with water, to remove the hydrochloric acid, preferably by putting the sulfur-free stone through a centrifugating machine or the like.

The stone is then dried on a steam plate, and when dry is ready for the reception of the $Ca_2Fe(CN)_6$.

The coating of the distributing support is preferably effected as follows:

The requisite amount of stone, in about one quarter inch cubes, is placed in shallow open trays and the concentrated solution of calcium ferrocyanid is then flowed thereover and agitated therewith on a steam plate.

All water is evaporated off to leave a coating of pure calcium ferrocyanid upon the walls of the pores of the pumice; the drying operation preferably, being effected at about 100° C.

When no more water is given off, the coated pumice is preferably transferred to a preparing autoclave; although it may be placed directly in the synthesizing autoclave.

As the treatment now to be described, consumes considerable time, it is, however, desirable to provide such an auxiliary autoclave for the initial treatment of the catalyst.

Air is, of course, carefully excluded, and I prefer to flow a cold dry mixture of nitrogen and hydrogen (or one or the other of these gases) through the coated pumice lumps,—to remove all traces of free oxygen therefrom. The nitrogen-hydrogen mixture is preferably supplied at the rate of about three cubic feet per hour, and the temperature of the material in the preparing autoclave, and preferably also that of the gaseous mixture passed therethrough, is raised to about 150° C. It is advantageous to prolong this mild heating for say, ten or twelve hours.

The temperature is then gradually raised to 200° C., during about six hours and is preferably held there for a couple of hours. It is then further elevated to about 300° C., during a period of about six hours more, and is held at that temperature for, say, three hours.

I thereafter further raise the temperature to about 350° C., and similarly, preferably, maintain such temperature for several hours more.

I have discovered that the activating temperature of this class of substances is quite constant, and, moreover, that it is not far from 360° in each case. The activating temperature for calcium ferrocyanid is just about 360°. It is necessary to use extreme caution in the further treatment of this and like material when said activating temperature is reached or passed.

This is so, because before the activating temperature is reached and at atmospheric pressure there is practically no synthesis of ammonia; or, at most, not much more than a trace. As this activating temperature is reached, however,—synthesis begins to occur and the ammonia forming reaction is a strongly exothermic one. As a result, the temperature tends to rapidly build up and the catalyst, hence, may be inadvertently spoiled; or, at any rate, become practically useless for the commercial synthetizing of ammonia.

It is preferable, therefore, before raising the temperature above 350° C.—attained with caution as aforesaid,—to shut off the flow of gas, if the said gas be a mixture of nitrogen and hydrogen in combining proportions; since otherwise, even when the material is in the form of thin films carried on pumice lumps, the temperature will rise suddenly to 600° C., or more.

I may here observe that there is a special relation between the pumice or its equivalent and the catalytic material proper; in that if one attempts to treat lumps of calcium ferrocyanid or the like,—even with the extreme care urged in the foregoing,— still, the catalyst will be rendered commercially useless if the mass being treated is of a size or bulk such as is required for even a reasonably large scale working. That is to say, it is at times possible to use but a few grains, or a small quantity, of calcium ferrocyanid, in, for example, powdered form and to convert this into somewhat active catalytic material; when the tube, or the like, which holds said powder is adapted to convey away the excess heat and thereby to prevent undue rise of temperature.

The cost of so handling relatively minute quantities of the material, is, obviously, practically prohibitive for commercial working, and the provision of a distributive carrier such as pumice, is hence substantially imperative, if one is to obtain catalytic material in considerable bulk, without involving inordinate expense.

Returning now to the preparation of the still not fully activated catalyst,—the material, which is thus raised to 350° C., is thereafter cooled to room temperature and may then be transferred to the contact-pressure apparatus.

It will be observed that the foregoing operations have all been conducted preferably at atmospheric pressure. This precaution need not be observed during the earlier heat treatment; although it is desirable even then.

When, however, the temperature has been caused to approach the activating point, it is highly desirable that the gaseous mass of nitrogen and hydrogen flowing in contact therewith be not under any considerable pressure, under the described conditions; since otherwise, it will frequently happen that the ammonia-forming reaction will start and the temperature of the catalyst rise unduly as a result.

Assuming that the material is now in place in the contact chamber, or operating autoclave; I then preferably supply a mixture of hydrogen and nitrogen, at the rate of about 300 cubic feet per hour, and under about 100 atmospheres pressure, to this autoclave,—simultaneously gradually elevating the temperature of the material under treatment, at first to about 100° C., and thereafter gradually up to about 300° C. During this operation the temperature of the mass is constantly observed and if it starts to run up unduly fast, the supply of the nitrogen and hydrogen mixture passing therethrough, is cut down, or the pressure is reduced, or if necessary both of these corrective measures are employed.

As the temperature passes 300° C., the pyrometer, or its equivalent, should be still more carefully watched and the flow of gas and the pressure even more carefully controlled.

When 360° has been reached, I prefer to hold this temperature for about an hour, thereafter supplying a little more gas and thereby permitting the temperature to rise until about 450° has been attained.

It is desirable to then immediately drop the pressure somewhat, in order to hold the temperature at this point. Especially during the latter part of the above described treatment,—by which nearly complete activation is normally attained,—a rapid alteration in the molecular construction of the catalytic material, takes place; as is evidenced by the fact that considerable hydrocyanic acid is present in the gas emerging from the autoclave.

Tests of this gas are conducted from time to time during the course of the operation; and when, following the attainment of 450°,—it is found that further production of hydrocyanic acid gas has ceased; or in other words, that all cyanogen radicals capable of liberation have been given off,— I further reduce the pressure to about 1000 lbs. per square inch and increase the rate of flow of gas through the charge to about 400 cubic feet per hour. The temperature of the catalytic material then jumps rapidly to about 600° C.; but I very greatly prefer that it shall not remain at this elevated temperature for more than a very short time.

As soon as said temperature is reached, therefore, the pressure is dropped, until the temperature falls again to about 450°. Desirably also, the rate of flow of the gas through the catalyst is reduced to this same end.

The rate of flow and pressure are thereafter held, so as to maintain the temperature constant at about 450°; and the commercial synthesizing of ammonia is thereupon begun; gas being supplied at the rate of about 400 cubic feet per hour and the pressure being worked up gradually again to about 100 atmospheres, and the temperature being held at about 450° C.

Again, if the temperature tends to rise at any time, the pressure is dropped sufficiently to stabilize said temperature and if the operation has been conducted carefully, an equilibrium is reached at which there is but little or no tendency for the temperature to change. The above operation, it may be here stated, is preferably conducted in an autoclave having an inside diameter of about eight inches and a length of about eight feet; the actual volume of catalyst, including, of course, its distributive support being about two cubic feet.

At the rate of flow above noted, when operating under the conditions aforesaid, the yield of ammonia is about eight per cent. by volume of the outgoing gases.

If the rate of flow is decreased to, for example, somewhat less than 200 cubic feet per hour, this percentage by volume of ammonia in the outgoing gases will rise to about sixteen per cent.; but, under such conditions, obviously, the yield of ammonia in pounds per hour per autoclave is less than when operating with a higher rate of flow.

The principal point to be emphasized is the necessity for substantially preventing the automatic rise in temperature of the catalytic material during its preparation, until after the catalyst has become stabilized.

If this precaution be not observed and the catalyst be not "controlled" in substantially the manner described,—its temperature might otherwise rise to 700° or 800° C., or even higher, and the catalyst be completely ruined.

The provision of a distributing support, such as pumice, is essential to this control, in so far as any practical or commercial results are concerned; since without the provision of such a carrier, as above noted, it becomes exceedingly difficult to prevent an excessive rise of temperature, especially in the inner or central portions of the catalytic body,—said body being itself an exceedingly poor conductor of heat.

I am of the opinion that the pumice functions in two ways in this connection: In the first place it acts as a distributer or diluent; permitting of such a disposition of the catalyst proper, as will afford but a small percentage by volume thereof in a given space.

Second. It allows of the provision of an adequate flow of gas through the charge with consequent possible regulation of heat in the interior of the charge.

There is also a third and very valuable function of such low specific gravity supporting-material as pumice; in that, since the catalytic charge is in the form of small lumps, said lumps may be blown out of the autoclave and over into another receptacle, with exclusion of air,—by the application of a jet of nitrogen or hydrogen or of a mixture of nitrogen and hydrogen,—e. g., a jet of the working gases.

This allows of the provision of autoclaves with but one opening (preferably at the top), which reduces the chance for leakage.

In actual practice this characteristic of my novel catalytic material is hence of immense value; especially since by reason thereof, and by thus ejecting spent catalyst from its container by gaseous pressure,—I am enabled to continue the synthesizing operation substantially without loss of time and heat; both of which would otherwise be involved in the steps of discharging and recharging the autoclave.

In general as I am aware of various modifications of and changes in my process and preferred catalyst, I desire to be limited only by the scope of the appended claims broadly interpreted in the light of my disclosure. In this connection, it is to be noted that the term "alkalinous metal" is to be regarded as of sufficient breadth to cover both the alkali metals and those of the alkaline earth metal group.

Having thus described my invention, what I claim is:

1. The process of preparing a catalyst adapted for the synthesis of ammonia from its elements, which comprises coating the walls of a distributive support for said catalyst, with an alkalinous metal iron cyanid, and reacting upon said cyanid to convert it into films of active catalytic material, while eliminating from said films a part at least of their cyanogen content.

2. The process of preparing a catalyst adapted for the synthesis of ammonia from its elements, which comprises coating the walls of a distributive support for said catalyst, with an alkalinous metal iron cyanid, and reacting upon said cyanid to convert it into films of active catalytic material, while eliminating from said films a part at least of their cyanogen content, said reaction being effected through the intermediacy of heat, a part of which is afforded by exothermically reacting with nitrogen upon hydrogen in the presence of said films, after the temperature of said support has been elevated above 360° C.

3. The process of preparing a catalyst adapted for the synthesis of ammonia from its elements, which comprises coating pumice with an alkalinous metal iron cyanid, and reacting upon said cyanid to convert it into films of active catalytic material, while eliminating from said films a part at least of their cyanogen content.

4. A catalyst adapted for the synthesis of ammonia from its elements, which comprises film-like formations of a product derived from an alkalinous metal iron cyanid, the molecules of which product have been so stabilized by gradual heat treatment while in the presence of the gases to be synthesized, that the catalyst comprising them can be continuously subjected to contact with a current of said gases under a pressure and at a temperature at which ammonia can copiously form.

5. A catalyst adapted for the synthesis of ammonia from its elements, which comprises a product derived from an alkalinous metal iron cyanid the molecules of which product have been so stabilized by gradual heat treatment while in the presence of the gases to be synthesized, that the catalyst comprising them can be continuously subjected to contact with a current of said gases under a pressure and at a temperature at which ammonia can copiously form.

6. The process of preparing a catalyst adapted for the synthesis of ammonia from its elements, which comprises coating the walls of a distributive support for said catalyst, with an alkalinous metal iron cyanid, by immersing said support in a solution of said cyanid in water and evaporating off said water, then reacting upon the so deposited cyanid, to convert it into films of active catalytic material, while eliminating from said films a part at least of their cyanogen content.

In testimony whereof I have affixed my signature, in the presence of two witnesses.

JOHN COLLINS CLANCY.

Witnesses:
 HOWARD C. RIPLEY,
 HELEN W. BARNBROOK.